(12) United States Patent
Kurisu (10) Patent No.: US 7,528,073 B2
(45) Date of Patent: May 5, 2009

(54) DRY ETCHING METHOD AND DIFFRACTIVE OPTICAL ELEMENT

(75) Inventor: Kenichi Kurisu, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 414 days.

(21) Appl. No.: 11/266,407

(22) Filed: Nov. 4, 2005

(65) Prior Publication Data

US 2006/0110925 A1  May 25, 2006

(30) Foreign Application Priority Data

Nov. 4, 2004  (JP) .............................. 2004-321000

(51) Int. Cl.
*H01L 21/302*  (2006.01)
*H01L 21/461*  (2006.01)

(52) U.S. Cl. .................. 438/706; 438/709; 438/711; 257/40; 257/43

(58) Field of Classification Search ................. 438/706, 438/709, 711, 717; 257/40, 43
See application file for complete search history.

(56) References Cited

U.S. PATENT DOCUMENTS

| | | | | |
|---|---|---|---|---|
| 4,399,016 A | * | 8/1983 | Tsukada et al. | 156/345.45 |
| 4,803,100 A | * | 2/1989 | Ameen et al. | 427/387 |
| 5,550,711 A | * | 8/1996 | Burns et al. | 361/728 |
| 5,982,545 A | * | 11/1999 | Su | 359/569 |
| 6,407,965 B1 | * | 6/2002 | Matoge et al. | 368/204 |
| 2004/0241973 A1 | * | 12/2004 | Kijima et al. | 438/597 |
| 2005/0073039 A1 | * | 4/2005 | Kasuya et al. | 257/690 |

FOREIGN PATENT DOCUMENTS

| | | |
|---|---|---|
| JP | 63-311726 A | 12/1988 |
| JP | 5-136253 A | 6/1993 |
| JP | 59-175727 | 10/1998 |
| JP | 11-012769 | 1/1999 |
| JP | 2002-075690 | 3/2002 |
| JP | 2002-221614 | 8/2002 |
| JP | 2003-114400 | 4/2003 |

OTHER PUBLICATIONS

Japanese Office Action, with English translation, issued in Japanese Patent Application No. JP2004-321000 dated on Jun. 10, 2008.

* cited by examiner

*Primary Examiner*—Phuc T Dang
(74) *Attorney, Agent, or Firm*—McDermott Will & Emery LLP (57) ABSTRACT

A dry etching method is provided, in which dry etching is performed in such a manner that a conductor to which an insulative substrate is attached is brought in electric, intimate contact with an electrode. In the dry etching method, the insulative substrate is attached to the conductor by means of a conductive grease. A diffractive optical element manufactured with the dry etching method is also provided.

7 Claims, 6 Drawing Sheets

DRY ETCHING METHOD AND DIFFRACTIVE OPTICAL ELEMENT

BACKGROUND OF THE INVENTION

1. Field of the Invention

The present invention relates to a dry etching method and a diffractive optical element (DOE), and more particularly to a dry etching method achieving a stable etching rate as well as a DOE manufactured with that method.

2. Description of the Background Art

In recent years, electronic components and devices used in a portable telephone, a personal computer or the like have been reduced in size, and finer and higher-speed drilling has been demanded. A DOE is a key device for meeting such demand. Unlike a conventional optical element utilizing refraction and reflection, the DOE makes use of diffraction phenomenon of light for directly controlling a phase, so that, for example, the DOE can serve as an optical element of which application to extensive fields such as a multi-point beam splitting function and the like can be expected.

For example, the DOE is utilized as a laser optical element. Specifically, the DOE is irradiated with one laser beam for material processing, and the laser beam is split into multiple beams for irradiating multiple points in order to simultaneously drill a plurality of holes, thus realizing high speed in drilling fine holes.

Figure 4:
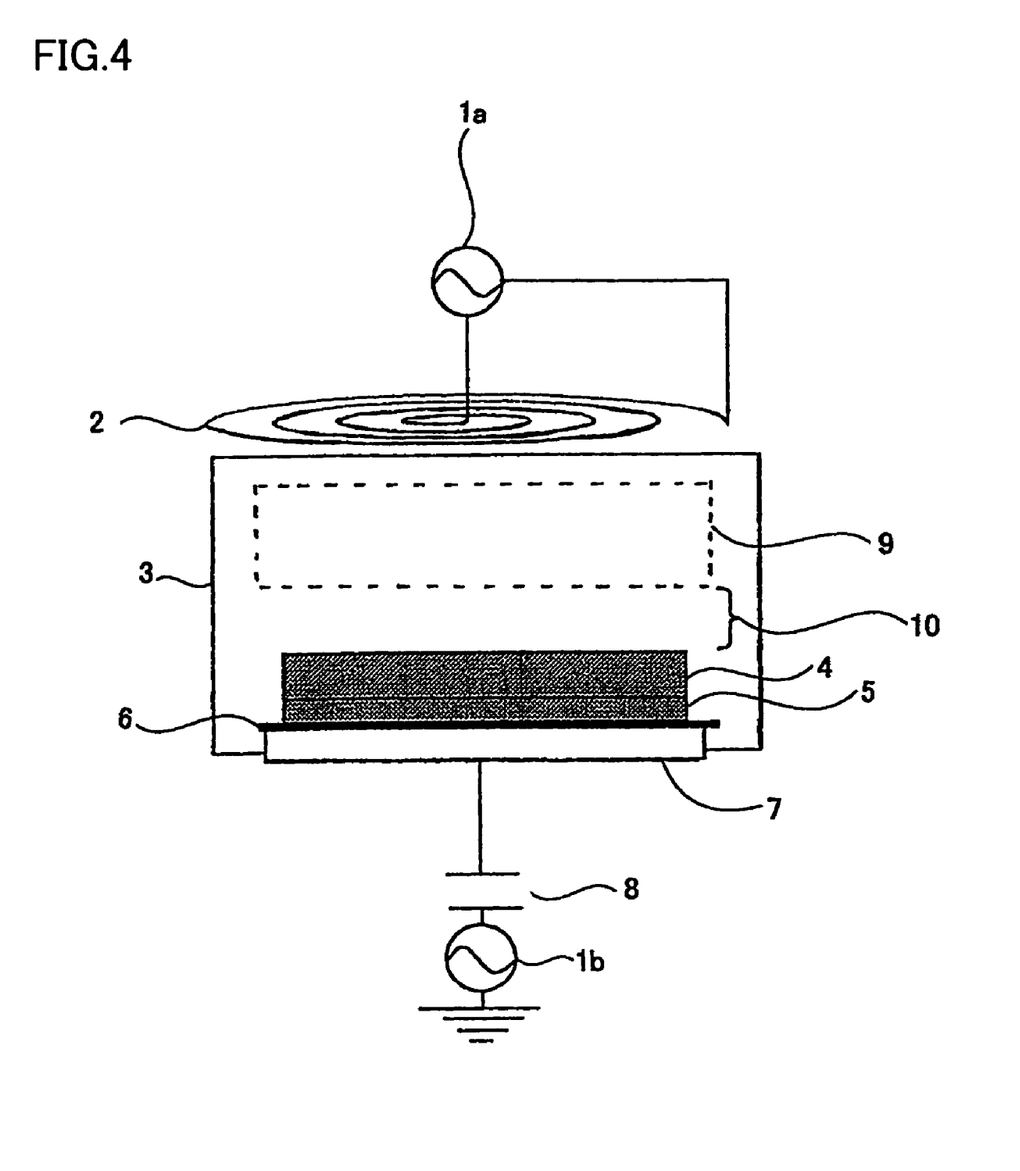
FIG. 4 is a schematic diagram of an exemplary conventional dry etching apparatus.

In order to manufacture a DOE, a dry etching method capable of accurate and micro processing is employed. FIG. 4 is a schematic diagram of an exemplary dry etching apparatus used in a conventional dry etching method. It is noted that the same or corresponding elements have the same reference characters allotted in the drawings of the subject application. The dry etching apparatus includes RF power supplies 1a, 1b, an ICP coil 2, a chamber 3, a conductor 6 implemented by a conductive Si wafer, an electrode 7 cooled by He gas or the like, and a blocking capacitor 8. An insulative substrate 4 serving as a material for the DOE is attached to conductor 6 by means of a vacuum grease 5, which is in turn placed in chamber 3 in such a manner that conductor 6 achieves electric, intimate contact with cooled electrode 7.

Then, a gas is supplied to chamber 3, and positive ions in plasma 9 generated as a result of application of high-frequency power by means of RF power supplies 1a, 1b collide with a surface of insulative substrate 4 because of intense electric field in a sheath region 10 created above insulative substrate 4. Dry etching of insulative substrate 4 is thus performed.

In dry etching, a temperature of the insulative substrate is increased due to collision or chemical reaction of positive ions with the insulative substrate. Therefore, if a photoresist is used as a mask for the insulative substrate, the photoresist is baked due to the increase in the temperature of the insulative substrate, which results in failure in removing the photoresist, or damage or roughness of the surface of the insulative substrate. To address this problem, insulative substrate 4 is attached to conductor 6 by means of vacuum grease 5 as shown in FIG. 4, and conductor 6 is brought in electric, intimate contact with cooled electrode 7 by utilizing electrostatic attraction or the like, so that entire insulative substrate 4 is uniformly cooled through conductor 6 and increase in the temperature of insulative substrate 4 is suppressed.

In the conventional dry etching method, however, an etching rate has not been stable. Preferably, a plurality of insulative substrates are simultaneously dry-etched from a viewpoint of efficiency, however, there has been variation in etching rates as well as in etching depths of insulative substrates.

SUMMARY OF THE INVENTION

Figure 1:
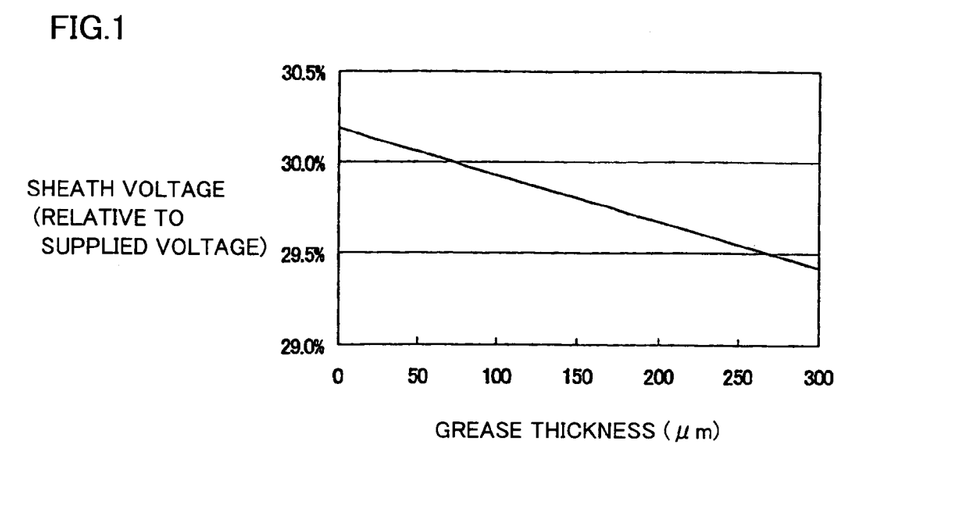
FIG. 1 shows relation between a thickness of a vacuum grease and a sheath voltage.

The present inventor has studied relation between a thickness of the vacuum grease and a sheath voltage, using the dry etching apparatus shown in FIG. 4. As shown in FIG. 1, it has been found that the sheath voltage is lowered with the increase in the thickness of the vacuum grease. Accordingly, in order to stabilize the etching rate, the thickness of the vacuum grease provided between the insulative substrate and the conductor needed to be precisely uniform each time the DOE is manufactured. In addition, when a plurality of insulative substrates are simultaneously dry-etched, the thickness of the vacuum grease provided between each insulative substrate and the conductor needed to be precisely equal among the insulative substrates.

In FIG. 1, the abscissa represents a thickness of the vacuum grease, while the ordinate represents a ratio of the sheath voltage relative to a supplied voltage within the chamber. It is assumed here that variation in a capacity caused by increase in the thickness of the vacuum grease is compensated for by the blocking capacitor so as to maintain constant the capacity of an entire system.

Alternatively, a method of suppressing the increase in the temperature of the insulative substrate by pressing the insulative substrate against the cooled electrode by means of a clamp may be possible. This method, however, is disadvantageous in that deformation of or damage to the insulative substrate is likely and a structure of the dry etching apparatus becomes complicated.

An object of the present invention is to provide a dry etching method achieving a stable etching rate as well as a DOE manufactured with this dry etching method.

The present invention is directed to a dry etching method in which dry etching is performed in such a manner that a conductor to which an insulative substrate is attached is brought in electric, intimate contact with an electrode. In the dry etching method, the insulative substrate is attached to the conductor by means of a conductive grease.

The dry etching method according to the present invention is preferably performed by using at least one selected from the group of ICP (Inductively Coupled Plasma) plasma, CCP (Capacitively Coupled Plasma) plasma, ECR (Electron Cyclotron Resonance) plasma, and NLD (Neutral Loop Discharge) plasma.

In addition, in the dry etching method according to the present invention, the insulative substrate is preferably composed of ZnSe polycrystal.

Alternatively, in the dry etching method according to the present invention, the insulative substrate is preferably composed of $SiO_2$.

In the dry etching method according to the present invention, a photoresist is preferably formed on a surface of the insulative substrate.

In the dry etching method according to the present invention, a plurality of insulative substrates can simultaneously be dry-etched.

Moreover, the present invention is directed to a DOE manufactured with the dry etching method described above.

According to the dry etching method of the present invention, the etching rate can be stabilized. Therefore, a time period for dry etching is controlled by using the dry etching method according to the present invention, so that a high-quality DOE can be manufactured with excellent reproducibility. In addition, according to the dry etching method of the present invention, even when a plurality of insulative substrates are simultaneously dry-etched, variation in the etching rates among the insulative substrates can be suppressed. Therefore, variation in the etching depths among the insulative substrates can also be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention is directed to a dry etching method in which dry etching is performed in such a manner that a conductor to which an insulative substrate is attached is brought in electric, intimate contact with an electrode. In the dry etching method, the insulative substrate is attached to the conductor by means of a conductive grease.

The present inventor has paid attention to the fact that the sheath voltage generated in the sheath region that affects stability of the etching rate fluctuates depending on the thickness of the vacuum grease between the insulative substrate and the conductor.

Figure 2:
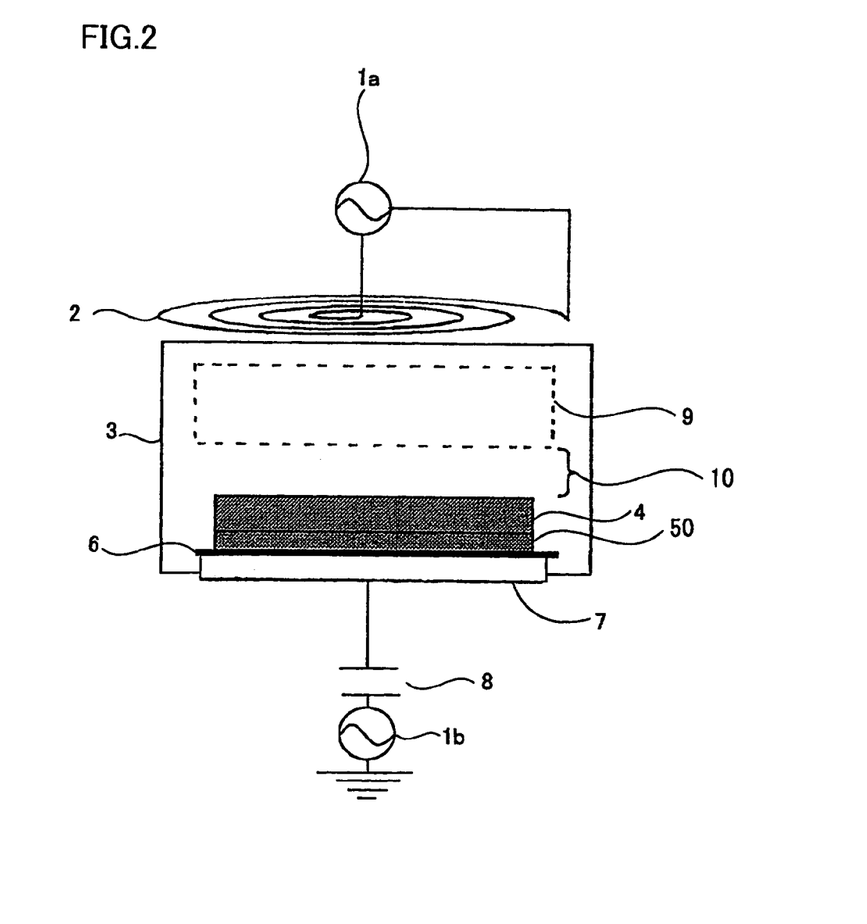
FIG. 2 is a schematic diagram of a preferred exemplary dry etching apparatus according to the present invention.

Specifically, the present inventor has successfully improved stability of the etching rate of insulative substrate 4 by using a conductive grease 50 instead of the vacuum grease as shown in the schematic diagram of FIG. 2 to lower the voltage applied to conductive grease 50 to a substantially negligible level, so that the sheath voltage does not fluctuate even when the thickness of conductive grease 50 is varied.

It is noted here that the conductive grease refers to a glue-like substance that generates a direct current when an electrostatic field is applied. From the viewpoint of improvement in stability of the etching rate, resistivity of the conductive grease is preferably set to 100Ω·cm or smaller, and more preferably to 50Ω·cm or smaller. In addition, the insulative substrate refers to a substrate that generates dielectric polarization, not the direct current, when an electrostatic field is applied.

The dry etching method according to the present invention is preferably performed by using at least one selected from the group of ICP plasma, CCP plasma, ECR plasma, and NLD plasma. In this case, as dry etching can be fine and highly anisotropic, a higher-quality DOE tends to be manufactured.

It is noted here that ICP plasma refers to inductively coupled plasma, which is generated by application of high-frequency power to the ICP coil. Meanwhile, CCP plasma refers to capacitively coupled plasma, which is generated by the electric field generated by charges present on the electrode. ECR plasma refers to electron cyclotron resonance plasma, which is generated by applying an alternating electric field to positive ions and electrons that are carrying out cyclotron motion in a magnetic field. NLD plasma refers to magnetic neutral loop discharge plasma, which is generated along a loop of magnetic neutral points where the magnetic field is zero.

One exemplary mechanism of the dry etching method according to the present invention will now be described. Initially, the insulative substrate is placed on the conductor on the electrode within the chamber, with the conductive grease being interposed. Thereafter, an etching gas is introduced into the chamber and high-frequency power is applied in the chamber, so as to generate plasma of the etching gas as well as activated species, positive ions and the like. Here, the sheath region attaining intense electric field is formed above the insulative substrate. Then, the activated species undergoes chemical reaction with the insulative substrate, to generate a secondary product, which is in turn sputtered by positive ions accelerated in the electric field in the sheath region. Etching of the insulative substrate thus proceeds. Therefore, for example, when a plurality of insulative substrates are simultaneously dry-etched, the sheath voltage does not fluctuate in spite of different thickness of the conductive grease among the insulative substrates. Therefore, variation in the etching rates among the insulative substrates can be suppressed.

In addition, the insulative substrate used in the dry etching method according to the present invention is preferably composed of ZnSe polycrystal. This is because ZnSe polycrystal has high transmittivity to infrared light and the DOE composed of ZnSe polycrystal is suitably adopted for processing electronic components or the like with the use of carbon dioxide gas laser that emits infrared light.

Alternatively, the insulative substrate used in the dry etching method according to the present invention is preferably composed of $SiO_2$ such as synthetic fused silica. This is because the DOE composed of $SiO_2$ is suitably adopted for processing electronic components or the like with the use of YAG laser (such as fundamental wave, second harmonic, third harmonic or fourth harmonic).

Preferably, a photoresist having a hole formed in a portion corresponding to a location to be dry-etched is formed on the surface of the insulative substrate used in the dry etching method according to the present invention. This is because a high-quality DOE tends to be manufactured by dry-etching solely the hole portion provided in the photoresist.

When the insulative substrate is dry-etched using the dry etching method according to the present invention, a high-quality DOE having an etched groove of a prescribed depth can be manufactured with excellent reproducibility. The surface of the DOE may be coated with a substance suppressing reflection of light.

EXAMPLE

Example 1

Insulative substrate 4 composed of synthetic fused silica was etched by ICP plasma, using the dry etching apparatus shown in FIG. 2.

Initially, a photoresist having a hole of a prescribed pattern formed was formed on the surface of disc-shaped insulative substrate 4 (diameter: 50 mm, thickness: 5 mm) composed of synthetic fused silica.

Thereafter, conductor 6 implemented by a conductive Si wafer was placed on electrode 7 in the dry etching apparatus shown in FIG. 2, and insulative substrate 4 was attached to conductor 6 by means of conductive grease 50 obtained by blending carbon in silicon oil (resistivity: 49Ω·cm, "KS660" manufactured by Shin-etsu Silicone).

Figure 3:
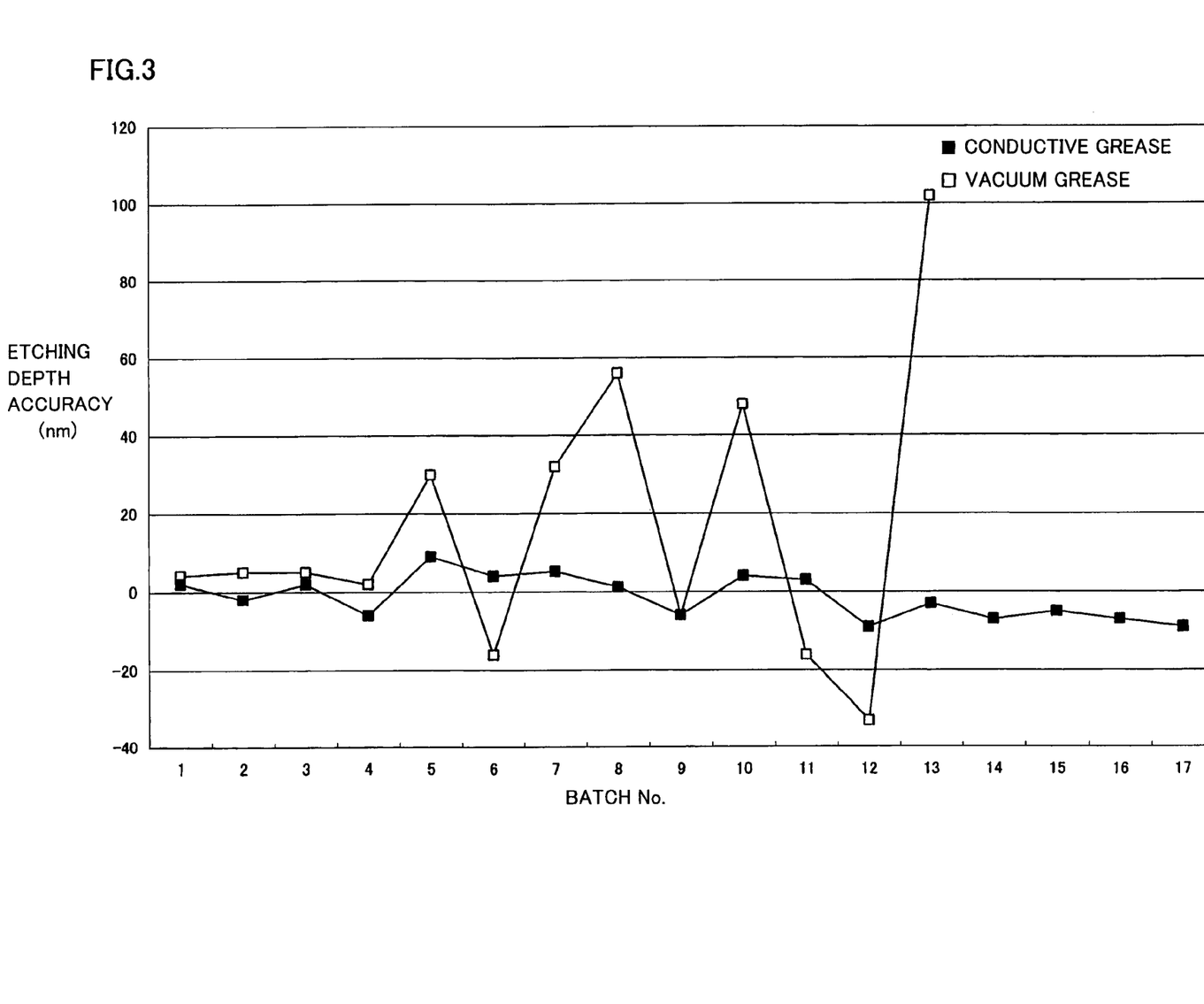
FIG. 3 shows comparison of etching depth accuracy between Example and Comparative Example.

Then, chamber 3 was evacuated until the pressure therein was set to approximately $10^{-5}$ Pa, and $CHF_3$ (flow rate: 5 sccm) and Ar (flow rate: 70 sccm) were introduced into chamber 3. In succession, while the pressure within chamber 3 was set to 1 Pa, 17 insulative substrates 4 (batch Nos. 1 to 17) were dry-etched one by one, each for an identical time period, by plasma 9 generated as a result of application of high-frequency power to RF power supplies 1a, 1b (ICP power: 200 W, RF power: 300 W), such that the depth of the etched groove was set to 1 μm. FIG. 3 shows the result. In FIG. 3, the abscissa represents batch Nos. 1 to 17 of the insulative substrates, while the ordinate represents a difference (etching depth accuracy) between a target etched groove depth, i.e., 1 μm, and an actual etched groove depth.

As shown in FIG. 3, it was found that, in Example 1 using conductive grease 50, the etching depth accuracy was 10 nm or smaller and the etching rate was stable. In addition, the temperature of insulative substrate 4 during the dry etching was within a range from 93° C. to 121° C., and it was also found that the insulative substrate 4 was cooled, relative to the temperature of 171° C. or higher when insulative substrate 4 was not cooled. Moreover, after completion of dry etching, the photoresist on the surface of insulative substrate 4 could easily be removed by applying acetone.

Comparative Example 1

Insulative substrates 4 composed of synthetic fused silica represented by batch Nos. 1 to 13 were dry-etched, in a manner similar to that in Example 1 except for the use of the dry etching apparatus shown in FIG. 4 and the use of vacuum grease 5 instead of the conductive grease, that is obtained by blending fine powder silica in dimethyl silicone oil (resistivity: $10^{14}$ Ω·cm, "H.V.G" manufactured by Dow Corning Toray Silicone Co., Ltd.). FIG. 3 shows the result. As shown in FIG. 3, it was found that, in Comparative Example 1 using the vacuum grease, the etching depth accuracy was 100 nm or larger, and the etching rate was not as stable as in Example 1.

Example 2

Figure 5A:
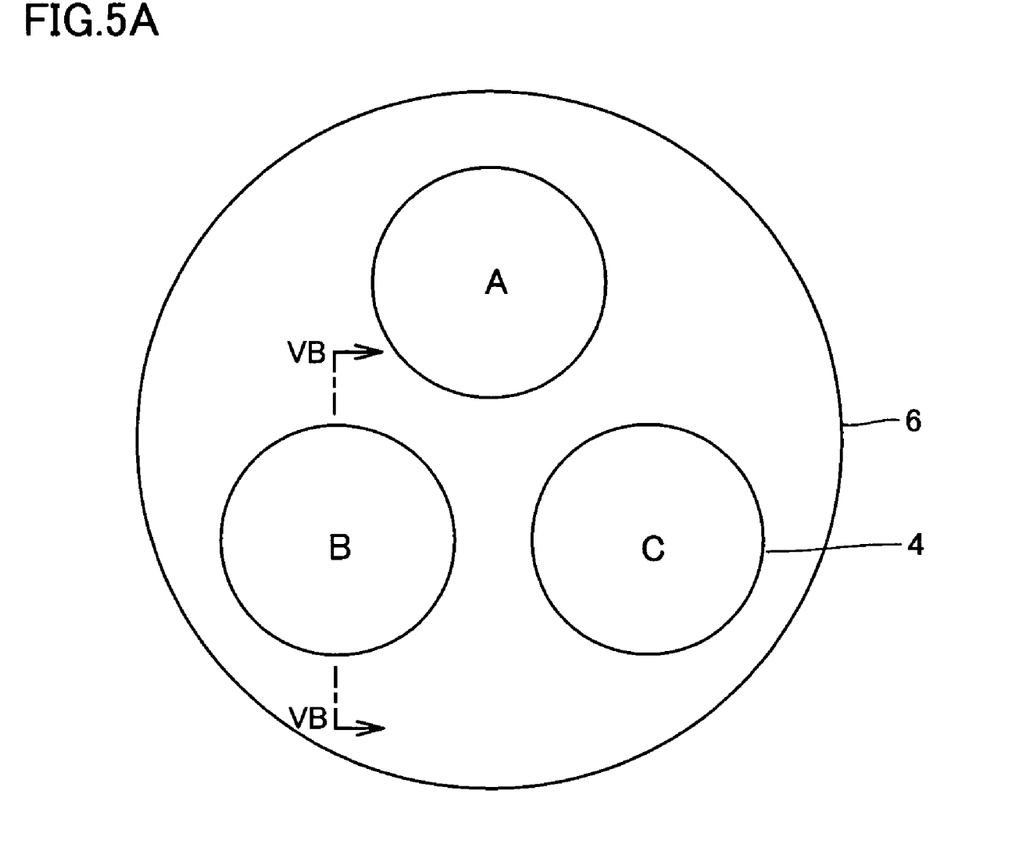
FIG. 5A is a schematic plan view of a conductor carrying three insulative substrates.
Figure 5B:
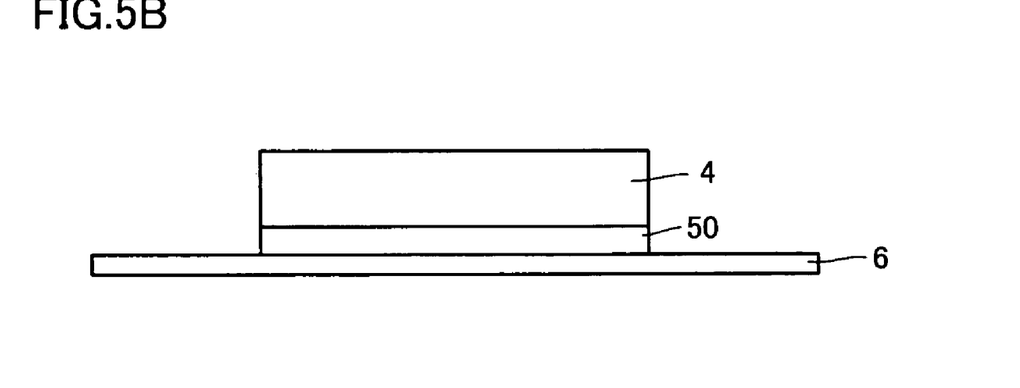
FIG. 5B is a cross-sectional view along the line VB-VB in FIG. 5A.

As shown in FIG. 5A, three insulative substrates 4 (A to C) composed of synthetic fused silica were placed on conductor 6 implemented by the conductive Si wafer shown in FIG. 2. Here, as shown in FIG. 5B, three insulative substrates 4 were placed on conductor 6 with conductive grease 50 obtained by blending carbon in silicon oil (resistivity: 49Ω·cm, "KS660" manufactured by Shin-etsu Silicone) being interposed. Each of three insulative substrates 4 (A to C) had a diameter of 50 mm and a thickness of 5 mm.

Thereafter, insulative substrates 4 (A to C) were subjected to dry etching, as in Example 1. Then, the depth of the etched groove in each of insulative substrates 4 (A to C) after dry etching was measured. Table 1 shows the depth of the etched groove measured in Example 2.

In Example 2, dry etching was performed such that the depth of the etched groove in each of three insulative substrates 4 (A to C) was set to 1200 nm. In addition, both of dry etching and measurement of depth of the etched groove were performed six times. Batch Nos. 1 to 6 in Example 2 in Table 1 represent respective 6 times of dry etching, and numeric values in the fields under batch Nos. 1 to 6 in Table 1 represent the depths of the etched grooves in three insulative substrates A to C in the dry etching respectively.

Comparative Example 2

Three insulative substrates 4 (A to C) composed of synthetic fused silica were dry-etched, in a manner similar to that in Example 2 except for the use of the vacuum grease instead of the conductive grease, that is obtained by blending fine powder silica in dimethyl silicone oil (resistivity: $10^{14}$ Ω·cm, "H.V.G" manufactured by Dow Corning Toray Silicone Co., Ltd.). Thereafter, as in Example 2, the depth of the etched groove in each of insulative substrates 4 (A to C) was measured. Table 1 shows the depth of the etched groove measured in Comparative Example 2.

In Comparative Example 2, both of dry etching and measurement of depth of the etched groove were performed twice. Batch Nos. 1 to 2 in Comparative Example 2 in Table 1 represent respective two times of dry etching, and numeric values in the fields under batch Nos. 1 to 2 in Table 1 represent the depths of the etched grooves in three insulative substrates A to C in the dry etching respectively.

TABLE 1

|  | Example 2 | | | | | | Comparative Example 2 | |
| --- | --- | --- | --- | --- | --- | --- | --- | --- |
|  | Batch No. | | | | | | | |
|  | 1 | 2 | 3 | 4 | 5 | 6 | 1 | 2 |
| Insulative substrate A | 1187 nm | 1188 nm | 1182 nm | 1187 nm | 1184 nm | 1186 nm | 1185 nm | 1188 nm |
| Insulative substrate B | 1186 nm | 1189 nm | 1182 nm | 1178 nm | 1188 nm | 1182 nm | 1180 nm | 1143 nm |
| Insulative substrate C | 1183 nm | 1179 nm | 1175 nm | 1185 nm | 1183 nm | 1189 nm | 1150 nm | 1167 nm |

As shown in Table 1, it could be confirmed that, in dry etching in Example 2 using the conductive grease, variation in the depths of the etched grooves in the insulative substrates (A to C) could be suppressed, as compared with dry etching in Comparative Example 2 using the vacuum grease.

Example 3

Figure 6A:
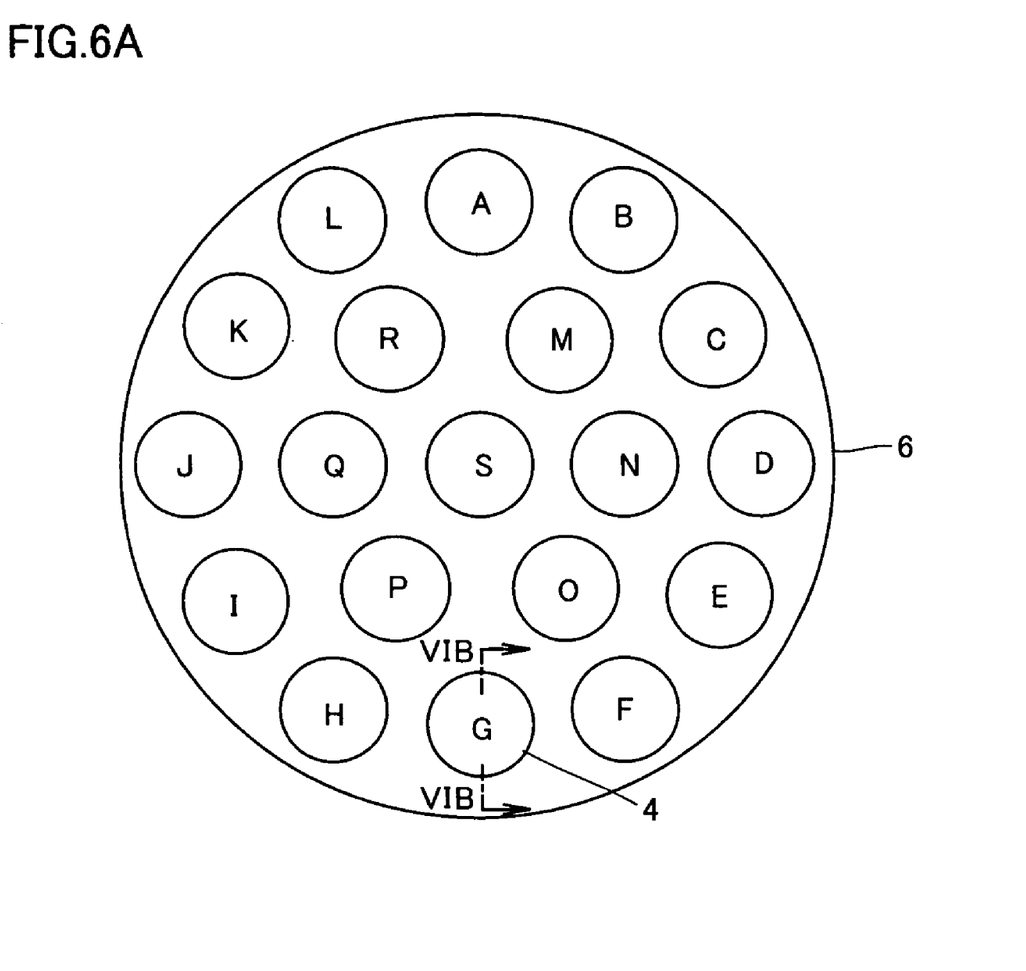
FIG. 6A is a schematic plan view of a conductor carrying 19 insulative substrates.
Figure 6B:
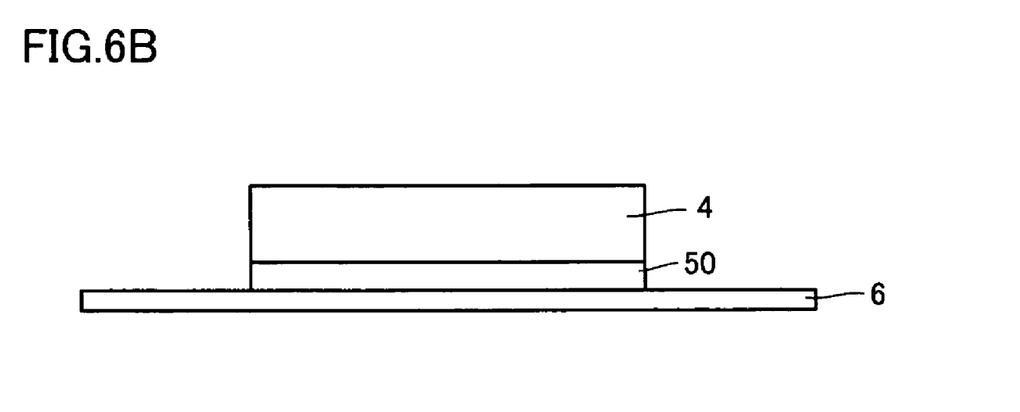
FIG. 6B is a cross-sectional view along the line VIB-VIB in FIG. 6A.

As shown in FIG. 6A, 19 insulative substrates 4 (A to S) composed of synthetic fused silica were placed on conductor 6 implemented by the conductive Si wafer shown in FIG. 2. Here, as shown in FIG. 6B, 19 insulative substrates 4 (A to S) were placed on conductor 6 with conductive grease 50 obtained by blending carbon in silicon oil (resistivity: 49Ω·cm, "KS660" manufactured by Shin-etsu Silicone) being interposed. Each of 19 insulative substrates 4 (A to S) had a diameter of 20 mm and a thickness of 3 mm.

Thereafter, insulative substrates 4 (A to S) were subjected to dry etching, as in Example 1. Then, the depth of the etched groove in each of insulative substrates 4 (A to S) after dry etching was measured. Table 2 shows the depth of the etched groove measured in Example 3.

In Example 3, dry etching was performed such that the depth of the etched groove in each of 19 insulative substrates 4 (A to S) was set to 1200 nm. In addition, both of dry etching and measurement of depth of the etched groove were performed twice. Batch Nos. 1 to 2 in Example 3 in Table 2 represent respective two times of dry etching, and numeric values in the fields under batch Nos. 1 to 2 in Table 2 represent the depths of the etched grooves in 19 insulative substrates A to S in the dry etching respectively.

Comparative Example 3

Nineteen insulative substrates 4 (A to S) composed of synthetic fused silica were dry-etched, in a manner similar to that in Example 3 except for the use of the vacuum grease instead of the conductive grease, that is obtained by blending fine powder silica in dimethyl silicone oil (resistivity: $10^{14}$ Ω·cm, "H.V.G" manufactured by Dow Corning Toray Silicone Co., Ltd.). Thereafter, as in Example 3, the depth of the etched groove in each of insulative substrates 4 (A to S) was measured. Table 2 shows the depth of the etched groove measured in Comparative Example 3.

In Comparative Example 3, both of dry etching and measurement of depth of the etched groove were performed once. Batch No. 1 in Comparative Example 3 in Table 2 represents dry etching of that one time, and numeric values in the fields under batch No. 1 in Table 2 represent the depths of the etched grooves in 19 insulative substrates A to S respectively.

TABLE 2

|  | Example 3 | | Comparative Example 3 |
| --- | --- | --- | --- |
|  | Batch No. | | |
|  | 1 | 2 | 1 |
| Insulative substrate A | 1185 nm | 1190 nm | 1165 nm |
| Insulative substrate B | 1189 nm | 1183 nm | 1185 nm |
| Insulative substrate C | 1183 nm | 1184 nm | 1174 nm |
| Insulative substrate D | 1192 nm | 1179 nm | 1195 nm |
| Insulative substrate E | 1185 nm | 1191 nm | 1186 nm |
| Insulative substrate F | 1176 nm | 1188 nm | 1193 nm |
| Insulative substrate G | 1186 nm | 1176 nm | 1154 nm |
| Insulative substrate H | 1180 nm | 1181 nm | 1136 nm |
| Insulative substrate I | 1191 nm | 1178 nm | 1201 nm |
| Insulative substrate J | 1178 nm | 1179 nm | 1184 nm |
| Insulative substrate K | 1180 nm | 1191 nm | 1176 nm |
| Insulative substrate L | 1186 nm | 1186 nm | 1186 nm |
| Insulative substrate M | 1190 nm | 1187 nm | 1194 nm |
| Insulative substrate N | 1188 nm | 1181 nm | 1187 nm |
| Insulative substrate O | 1185 nm | 1179 nm | 1165 nm |
| Insulative substrate P | 1182 nm | 1186 nm | 1198 nm |
| Insulative substrate Q | 1183 nm | 1190 nm | 1167 nm |
| Insulative substrate R | 1179 nm | 1187 nm | 1187 nm |
| Insulative substrate S | 1182 nm | 1186 nm | 1168 nm |

As shown in Table 2, it could be confirmed that, in dry etching in Example 3 using the conductive grease, variation in the depths of the etched grooves in the insulative substrates could be suppressed, as compared with dry etching in Comparative Example 3 using the vacuum grease.

Example 4

Figure 7A:
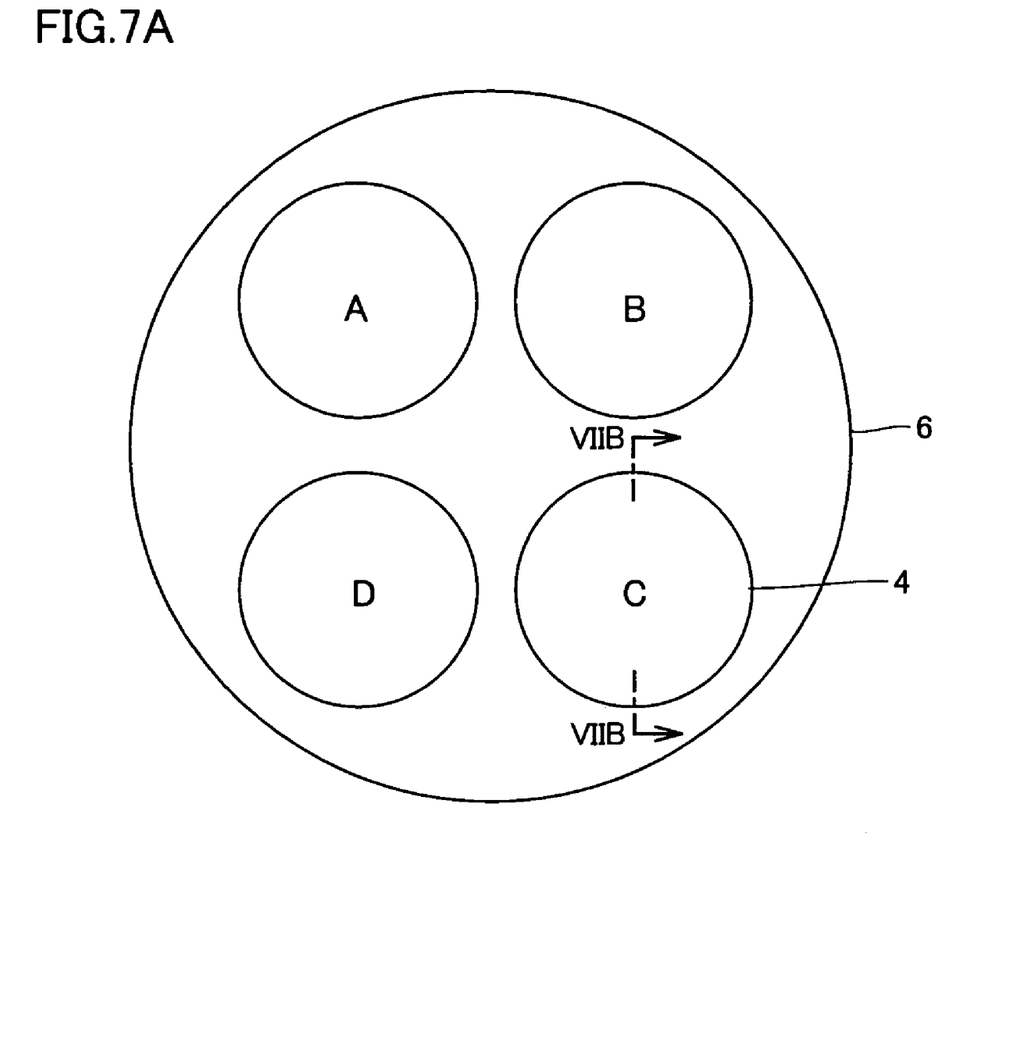
FIG. 7A is a schematic plan view of a conductor carrying four insulative substrates.
Figure 7B:
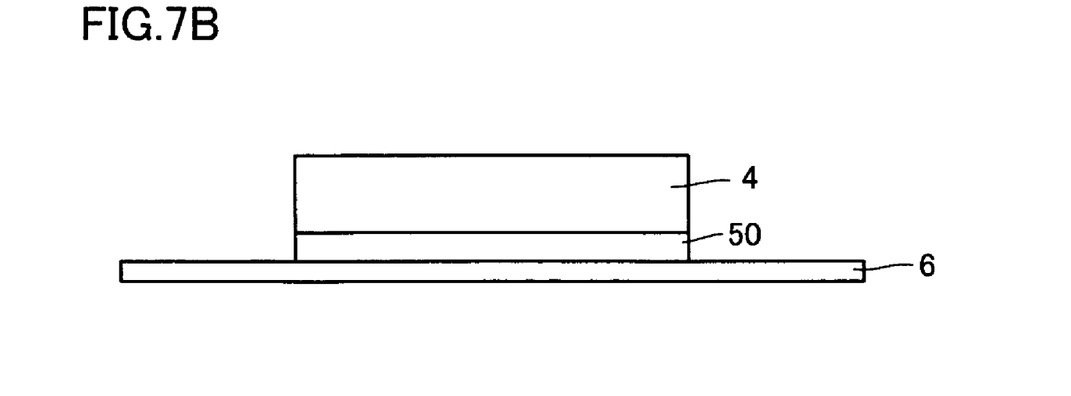
FIG. 7B is a cross-sectional view along the line VIIB-VIIB in FIG. 7A.

As shown in FIG. 7A, four insulative substrates 4 (A to D) composed of ZnSe polycrystal were placed on conductor 6 implemented by the conductive Si wafer shown in FIG. 2. Here, as shown in FIG. 7B, four insulative substrates 4 (A to D) were placed on conductor 6 with conductive grease 50 obtained by blending carbon in silicon oil (resistivity: 49Ω·cm, "KS660" manufactured by Shin-etsu Silicone) being interposed. Each of four insulative substrates 4 (A to D) had a diameter of 50 mm and a thickness of 5 mm.

Then, chamber 3 was evacuated until the pressure therein was set to approximately $10^{-5}$ Pa, and $BCl_3$ (flow rate: 10 sccm) and Ar (flow rate: 20 sccm) were introduced into chamber 3. In succession, while the pressure within chamber 3 was set to 3 Pa, four insulative substrates 4 (A to D) were dry-etched by plasma 9 generated as a result of application of high-frequency power to RF power supplies 1a, 1b (ICP power: 200 W, RF power: 300 W). Then, the depth of the etched groove in each of the insulative substrates A to D after dry etching was measured. Table 3 shows the depth of the etched groove measured in Example 4.

In Example 4, dry etching was performed such that the depth of the etched groove in each of four insulative substrates 4 (A to D) was set to 3800 nm. In addition, both of dry etching and measurement of depth of the etched groove were performed three times. Batch Nos. 1 to 3 in Example 4 in Table 3 represent respective three times of dry etching, and numeric values in the fields under batch Nos. 1 to 3 in Table 3 represent the depths of the etched grooves in four insulative substrates A to D in the dry etching respectively.

Comparative Example 4

Four insulative substrates 4 (A to D) composed of ZnSe polycrystal were dry-etched, in a manner similar to that in Example 4 except for the use of the vacuum grease instead of the conductive grease, that is obtained by blending fine powder silica in dimethyl silicone oil (resistivity: $10^{14}$ Ω·cm, "H.V.G" manufactured by Dow Corning Toray Silicone Co., Ltd.). Thereafter, as in Example 4, the depth of the etched groove in each of insulative substrates 4 (A to D) was measured. Table 3 shows the depth of the etched groove measured in Comparative Example 4.

In Comparative Example 4, both of dry etching of four insulative substrates 4 (A to D) and measurement of depth of the etched groove were performed once. Batch No. 1 in Comparative Example 4 in Table 3 represents dry etching of that one time, and numeric values in the fields under batch No. 1 in Table 3 represent the depths of the etched grooves in four insulative substrates A to D respectively.

TABLE 3

| | Example 4 | | | Comparative Example 4 |
|---|---|---|---|---|
| | Batch No. | | | |
| | 1 | 2 | 3 | 1 |
| Insulative substrate A | 3754 nm | 3777 nm | 3808 nm | 3846 nm |
| Insulative substrate B | 3802 nm | 3773 nm | 3786 nm | 3790 nm |
| Insulative substrate C | 3785 nm | 3813 nm | 3760 nm | 3692 nm |
| Insulative substrate D | 3820 nm | 3751 nm | 3816 nm | 3913 nm |

As shown in Table 3, it could be confirmed that, in dry etching in Example 4 using the conductive grease, variation in the depths of the etched grooves in the insulative substrates could be suppressed, as compared with dry etching in Comparative Example 4 using the vacuum grease.

In Examples 1 to 4 and Comparative Examples 1 to 4 described above, the depth of the etched groove in the insulative substrate was measured by using a stylus profilometer.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The dry etching method according to the present invention is suitably utilized not only in manufacturing a DOE but also in manufacturing a semiconductor device.

What is claimed is:

1. A dry etching method, comprising:
performing dry etching of an insulative substrate in such a manner that a conductor to which said insulative substrate is attached is brought in electric, intimate contact with an electrode,
wherein said insulative substrate is attached to said conductor by means of a conductive grease.

2. The dry etching method according to claim 1, wherein said dry etching method is performed by using at least one selected from the group of ICP plasma, CCP plasma, ECR plasma, and NLD plasma.

3. The dry etching method according to claim 1, wherein said insulative substrate is composed of ZnSc polycrystal.

4. The dry etching method according to claim 1, wherein said insulative substrate is composed of $SiO_2$.

5. The dry etching method according to claim 1, wherein a photoresist is formed on a surface of said insulative substrate.

6. The dry etching method according to claim 1, wherein a plurality of insulative substrates are simultaneously dry-etched.

7. A diffractive optical element manufactured wit the dry etching method according to claim 1.

* * * * *